(12) United States Patent
Xu et al.

(10) Patent No.: US 6,425,938 B1
(45) Date of Patent: Jul. 30, 2002

(54) SINGLE BED PRESSURE SWING ADSORPTION PROCESS

(75) Inventors: Jianguo Xu, Wrightstown; Mark Robert Pillarella, Center Valley; Douglas Paul Dee, Fogelsville; Rakesh Agrawal, Emmaus, all of PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/703,460

(22) Filed: Nov. 1, 2000

(51) Int. Cl.⁷ .......................................... B01D 53/053
(52) U.S. Cl. ........................ 95/100; 95/105; 95/130
(58) Field of Search ........................ 95/96–104, 130, 95/138

(56) References Cited

U.S. PATENT DOCUMENTS

| | | | | |
|---|---|---|---|---|
| 3,788,036 A | * | 1/1974 | Lee et al. .................... | 55/25 |
| 4,065,272 A | * | 12/1977 | Armond ..................... | 55/25 |
| 4,477,264 A | * | 10/1984 | Kratz et al. ................. | 55/25 |
| 4,561,865 A | * | 12/1985 | McCombs et al. ........... | 55/25 |
| 4,892,566 A | * | 1/1990 | Bansal et al. ............... | 55/26 |
| 5,032,450 A | * | 7/1991 | Knaebel ................ | 95/130 X |
| 5,228,888 A | * | 7/1993 | Gmelin et al. .............. | 55/25 |
| 5,370,728 A | * | 12/1994 | LaSala et al. .............. | 95/101 |
| 5,415,683 A | * | 5/1995 | Leavitt ...................... | 95/101 |
| 5,518,526 A | * | 5/1996 | Baksh et al. ............... | 95/101 |
| 5,565,018 A | * | 10/1996 | Baksh et al. ........... | 95/130 X |
| 5,658,371 A | * | 8/1997 | Smolarek et al. ........... | 95/101 |
| 5,679,134 A | * | 10/1997 | Brugerolle et al. .......... | 95/96 |
| 5,702,504 A | * | 12/1997 | Schaub et al. .......... | 95/130 X |
| 5,735,938 A | * | 4/1998 | Baksh et al. ............... | 95/101 |
| 5,772,737 A | * | 6/1998 | Andreani et al. ............. | 95/98 |
| 5,846,294 A | * | 12/1998 | Doong .................. | 95/130 X |
| 5,871,565 A | * | 2/1999 | Leavitt ..................... | 95/100 |
| 5,876,485 A | * | 3/1999 | Andreani .................. | 95/23 |
| 5,882,380 A | * | 3/1999 | Sircar ....................... | 95/98 |
| 5,961,694 A | * | 10/1999 | Monereau et al. ....... | 95/130 X |
| 5,997,612 A | * | 12/1999 | Doong .................. | 95/130 X |
| 6,010,556 A | | 1/2000 | Petit .......................... | 95/98 |
| 6,045,603 A | * | 4/2000 | Chen et al. ............ | 95/100 X |
| 6,048,384 A | * | 4/2000 | Smolarek ............... | 95/130 X |
| 6,054,052 A | * | 4/2000 | Monereau et al. ....... | 95/130 X |
| 6,071,328 A | * | 6/2000 | Petit et al. ............. | 95/130 X |
| 6,096,115 A | * | 8/2000 | Kleinberg et al. ........... | 95/101 |
| 6,099,618 A | * | 8/2000 | Monereau .............. | 95/130 X |
| 6,102,985 A | * | 8/2000 | Naheiri .................... | 95/101 |
| 6,171,371 B1 | * | 1/2001 | Derive et al. ........... | 95/130 X |
| 6,183,538 B1 | * | 2/2001 | Naheiri .................. | 95/130 X |
| 6,245,127 B1 | * | 6/2001 | Kane et al. ................ | 95/101 |
| 6,287,366 B1 | * | 9/2001 | Derive et al. ........... | 95/130 X |

FOREIGN PATENT DOCUMENTS

| | | | | |
|---|---|---|---|---|
| EP | 0884088 | * | 12/1998 | ......... B01D/53/053 |
| JP | H977502 | * | 3/1997 | ............ C01B/13/02 |
| JP | H10197408 | * | 7/1998 | ............ C01B/13/02 |

* cited by examiner

*Primary Examiner*—Robert H. Spitzer
(74) *Attorney, Agent, or Firm*—John M. Fernbacher

(57) ABSTRACT

A single bed pressure swing adsorption process with at least one transfer tank is utilized to separate less adsorbable components from more adsorbable components such as the separation of oxygen from air. Depressurization gas is collected in the transfer tank and is used later exclusively for purging the bed during the regeneration period.

14 Claims, 3 Drawing Sheets

SINGLE BED PRESSURE SWING ADSORPTION PROCESS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Pressure swing adsorption is a well-known method for the separation of bulk gas mixtures and for the purification of gas streams containing low concentrations of undesirable components. The method has been developed and adapted for a wide range of operating conditions, product purity, and product recovery. Many pressure swing adsorption systems utilize two or more adsorber beds operated in a cyclic sequence in order to maintain a constant product flow rate while selected beds undergo various steps including adsorption, depressurization, desorption, purge, pressure equalization, repressurization, and other related steps. Multiple adsorber beds using numerous process steps are required to achieve high purity and/or recovery of valuable gaseous products such as hydrogen, carbon oxides, synthesis gas, light hydrocarbons, and the like. The high cost of generating the feed gas mixtures containing these valuable components usually justifies the complexity and capital expense of multiple-bed pressure swing adsorption systems.

A number of single-bed pressure swing adsorption (PSA) processes have been developed and are known in the art. Many of these processes operate partially at pressures below atmospheric and are described as vacuum swing adsorption (VSA) or vacuum-pressure swing adsorption (VPSA) processes. In the present specification, pressure swing adsorption (PSA) is used as a generic term to describe all types of cyclic adsorption systems regardless of operating pressure levels.

Other gaseous products amenable to recovery by PSA do not require the high purity and/or recovery of the above-named products. In the recovery of oxygen and nitrogen from air by PSA, for example, a lower purity product containing 90 to 95 vol % oxygen is acceptable for many end uses, and simpler PSA systems can be used to provide such a product. These simpler PSA systems have significantly lower capital and operating costs than the multiple-bed systems earlier described. The simplest of these PSA systems for air separation utilize a single adsorber bed in conjunction with one or more gas storage vessels to allow constant product flow and provide gas for adsorber purge and pressurization during the regeneration portion of the PSA cycle.

PSA systems using a single adsorber and a single gas storage tank are well known in the art, being described in representative U.S. Pat. No. 4,561,865; 4,477,264; 4,892,566; 5,228,888; 5,415,683; 5,679,134; 5,876,485; 5,882,380; 6,102,985; and 6,096,115. Single adsorber/single tank systems also are described in Japanese Patent Application Kokai Nos. H9-77502 and H10-194708.

The use of two or more gas storage tanks can improve the overall performance of single adsorber PSA systems. Such systems are described in U. S. Pat. Nos. 3,788,036; 4,561,865; 5,370,728; 5, 658,371; 6,102,985; and 6,096,115; and in European Patent Publication EP 0 884 088 A1.

The invention described below and defined by the claims which follow is a single bed pressure swing adsorption process utilizing at least two gas storage tanks, an embodiment of which is useful for the recovery of oxygen from air with low capital and operating costs.

BRIEF SUMMARY OF THE INVENTION

The invention is a pressure swing adsorption process for the separation of a pressurized feed gas containing at least one more strongly adsorbable component and at least one less strongly adsorbable component which comprises:

(a) introducing the pressurized feed gas into a feed end of an adsorber vessel containing a solid adsorbent which preferentially adsorbs the more strongly adsorbable component, withdrawing from a product end of the adsorber vessel an adsorber effluent gas enriched in the less strongly adsorbable component, introducing adsorber effluent gas into a first gas storage tank, and withdrawing a final product gas from the first gas storage tank;

(b) terminating introduction of the pressurized feed gas into the adsorber vessel and depressurizing the adsorber vessel by withdrawing gas therefrom and introducing the withdrawn gas into a second gas storage tank;

(c) further depressurizing the adsorber vessel by withdrawing additional gas therefrom;

(d) purging the adsorber vessel by introducing gas from the second gas storage tank into the adsorber vessel while continuing to withdraw gas therefrom;

(e) terminating the introduction of gas from the second gas storage tank into the adsorber vessel and immediately thereafter repressurizing the adsorber vessel by introducing pressurized feed gas into the feed end thereof; and (f) repeating (a) through (e) in a cyclic manner.

The feed gas can be air, the more strongly adsorbable component can be nitrogen, and the less strongly adsorbable component can be oxygen. A final product gas typically is withdrawn from the first gas storage tank during (b) through (e).

At least a portion of the purging of the adsorber vessel in (d) can occur while the pressure therein is decreasing. At least a portion of the purging of the adsorber vessel in (d) can occur while the pressure therein is at a minimum pressure. At least a portion of the purging of the adsorber vessel in (d) can occur while the pressure therein is increasing. The minimum pressure can be below atmospheric pressure.

The second gas storage tank can have a length to diameter ratio greater than about 5, wherein gas is introduced into the tank at one end in (b) and withdrawn from the tank at the same end in (d).

In an alternative embodiment of the invention, further depressurization of the adsorber vessel is effected by withdrawing additional gas therefrom and introducing the gas withdrawn therefrom into a third gas storage tank. This embodiment also can comprise, following (d), purging the adsorber vessel by introducing gas from the third gas storage tank into the adsorber vessel while continuing to withdraw gas from the adsorption vessel.

In another embodiment, following termination of the introduction of pressurized feed gas into the adsorber vessel and prior to depressurizing the adsorber vessel by withdrawing gas therefrom and introducing the gas withdrawn therefrom into a second gas storage tank, the adsorber vessel is depressurized by withdrawing gas therefrom and introducing the gas withdrawn therefrom into the first gas storage tank.

At least a portion of the further depressurizing in (c) can be effected by venting gas from the adsorber vessel to the atmosphere.

The feed gas can be air, the more strongly adsorbable component can be nitrogen, and the less strongly adsorbable component can be oxygen. In this case, a portion of the pressurized feed gas for repressurizing the adsorber vessel can be provided by atmospheric air which flows into the adsorber vessel while the vessel pressure is below atmospheric pressure.

The purging of the adsorber vessel in (d) can be effected by
- (d1) introducing gas from the second gas storage tank into the adsorber vessel at a first flow rate; and
- (d2) introducing the gas from the second gas storage tank into the adsorber vessel at a second flow rate which is greater than the first flow rate;

while continuing to withdraw gas from the adsorber vessel during (d1) and (d2).

DETAILED DESCRIPTION OF THE INVENTION

Figure 1:
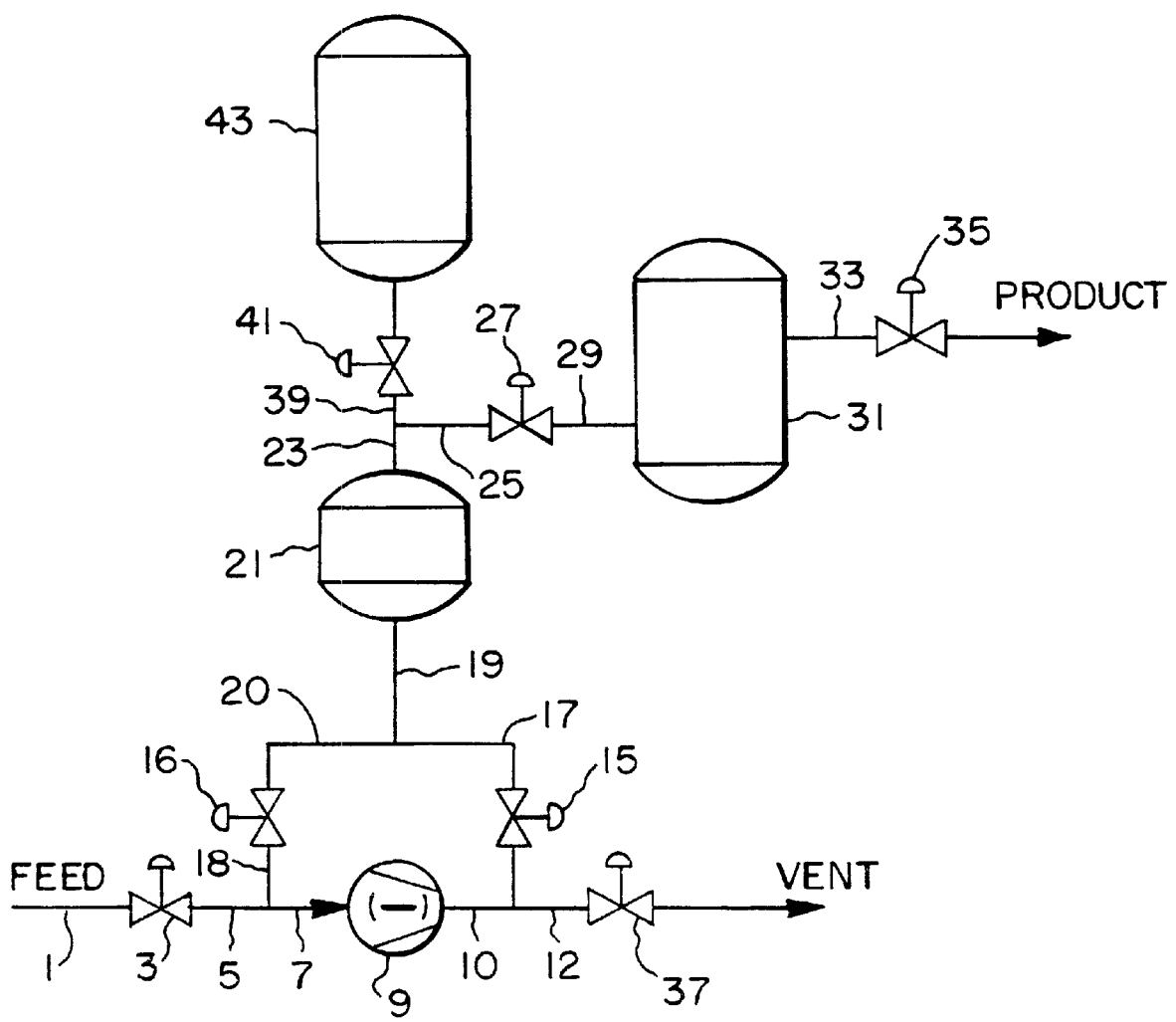
FIG. 1 is a schematic flow diagram of a PSA system used in the present invention.

The present invention is an adsorptive process for the separation of a gas mixture containing at least one more strongly adsorbable component and at least one less strongly adsorbable component, wherein the process utilizes various combinations of feed, depressurization, evacuation, purge, and repressurization steps. Dual gas storage tanks are utilized to provide purge gas which is independent of the supply of the final gas product. The desired product gas can be enriched in either the more strongly adsorbable component or the less strongly adsorbable component, and the adsorption process cycle is selected to yield the desired product gas. The invention is particularly useful for the recovery of oxygen from air, and the process has the potential for low capital and operating costs, including low power consumption.

In the descriptions of the embodiments of the present invention given herein, the following meanings are associated with specific terms used.

A feed step occurs during the time in which pressurized feed gas is introduced into the adsorber vessel and the more strongly adsorbable component is selectively adsorbed by the adsorbent material contained therein. Product gas enriched in the less strongly adsorbable component may be withdrawn during this step.

Pressurized feed gas is defined as feed gas which is at a pressure higher than the pressure in an adsorber vessel into which the feed gas is introduced. During the feed step, the pressurized feed gas can be provided by compression.

Depressurization is defined as the withdrawal of gas from the adsorber vessel accompanied by decreasing adsorber pressure, which desorbs the more strongly adsorbable component. Depressurization can be achieved by venting gas from a superatmospheric pressure directly to the atmosphere (typically described as blowdown) or to another process vessel or enclosed volume which is at a lower pressure. Depressurization also can be achieved by evacuation, defined as the withdrawal of gas from the adsorber by mechanical means such as a vacuum pump or blower. Evacuation can be carried out over any range of adsorber pressures, but typically is carried out at subatmospheric pressures, i.e., under vacuum.

Repressurization is defined as the introduction of gas into the adsorber vessel accompanied by increasing adsorber pressure. Pressurized feed gas can be introduced into the adsorber vessel for repressurization.

Purge is defined as the introduction of a purge gas enriched in the less strongly adsorbable component into one end of the adsorber while an effluent gas is withdrawn from the other end of the vessel. Usually the step is carried out countercurrently, i.e., in a flow direction opposite that of the feed step. Purge sweeps void space gas and desorbs residual adsorbed components from the adsorbent. Purge can be carried out at any pressure, but is most effective at subatmospheric pressures. As will be described below, the adsorber pressure may increase, decrease, or remain constant during any portion of a purge step.

Void space gas is defined as nonadsorbed gas contained within the interstitial or interparticle volume within the adsorber vessel, and includes gas in the piping and vessel dead volume in the vessel which is not occupied by adsorbent.

Final product gas is the gas withdrawn from a gas storage tank for external use and typically is enriched in the less strongly adsorbable component.

The present invention is directed to the separation of a gas mixture containing at least one more strongly adsorbable component and at least one less strongly adsorbable component, and typically recovers the less strongly adsorbed component as the primary product. In a preferred embodiment, the process is used to recover oxygen from air, but can be applied to the separation of other gas mixtures as well.

The process is illustrated below for the recovery of oxygen from air utilizing an apparatus shown schematically in FIG. 1 which is operated in a cycle which proceeds through the following steps.

1. Air Feed/Make Product

Atmospheric air, preferably filtered by known methods to remove harmful particulate material, flows through feed line 1, open valve 3, lines 5 and 7, and into the inlet of blower 9. Blower 9, typically a rotary-lobe Roots-type blower, compresses the air to a feed pressure typically in the range of 1.1 to 2.5 atmospheres absolute (atma). An aftercooler (not shown) following the blower optionally can be used. Pressurized feed gas flows through open valve 15 and through lines 17 and 19 into adsorber vessel 21 containing adsorbent material which selectively adsorbs nitrogen, a more strongly adsorbed component in the air feed. Valve 16 remains closed.

Adsorber vessel 21 is initially at a typical intermediate pressure of about 1.05 to 2.5 atma as a result of a previous repressurization step (described below). Pressurized feed air increases the pressure in the adsorber vessel to the full adsorption pressure of about 1.1 to 2.5 atma over a period of about 3 to 60 seconds. Water present in atmospheric air can be removed upstream of adsorber vessel 21 by known methods, or alternatively can be removed by the use of adsorbent at the adsorber inlet end which preferentially adsorbs water.

As the pressurized air feed passes through the adsorber vessel, it is enriched in oxygen, a less strongly adsorbed component in the air feed. Oxygen-enriched adsorber effluent typically containing 85 to 95 vol % oxygen is withdrawn through lines 23 and 25, valve 27, and line 29. The adsorber effluent gas flows into gas storage tank 31 and final product gas is withdrawn through line 33 and optionally flow control valve 35.

The air feed step continues until the adsorbent approaches a predetermined level of nitrogen breakthrough and before complete adsorption equilibrium with feed air is reached in the adsorber. At this point the air feed step is terminated by closing valve 15 and opening valve 37.

Adsorber vessel 21 contains one or more adsorbents which preferentially adsorb nitrogen and thus enrich the adsorber effluent in oxygen. These adsorbents can be selected from the group consisting of monovalent, bivalent, or trivalent cation-exchanged zeolites having type A, type X, or mordenite structure. The cations can include sodium, calcium, lithium, zinc, and combinations thereof 1a. Partial Depressurization/Provide Product (optional)

During this optional step, adsorber vessel 21 is depressurized by a differential pressure of about 0.015 to 0.5 atm for 1.0 to 20 seconds wherein oxygen-rich void space gas flows through lines 23 and 25, valve 27, and line 29 into tank 31 as additional oxygen product gas. This optional step recovers valuable oxygen product and eliminates noise which would occur if the gas were to be vented to the atmosphere. This step is terminated by closing valve 27.

2. Depressurizationl Collect Purge

Valve 41 is opened and adsorber 21 is further depressurized by withdrawing gas via lines 23 and 39 into gas transfer tank 43 until the pressure in adsorber 21 falls to about 0.8 to 2.0 atma. The gas stored in tank 43 is utilized later in the purge step described below.

3. Further Depressurization

Valves 3 and 41 are closed and additional gas is withdrawn from adsorber 21 through lines 19 and 20, valve 16, line 18, and line 7 by blower 9, which discharges the depressurization gas through line 10, line 12, and valve 37, from which it is vented to the atmosphere through a silencer (not shown). If desired, gas can be vented directly to the atmosphere from adsorber 21 prior to evacuation or during the early stages of evacuation via line 19, line 17, valve 15, line 12, and valve 37.

Evacuation continues to an adsorber pressure of about 0.2 to 0.8 atma. The further depressurization step is typically 3 to 60 seconds in duration.

4. Countercurrent Purge

Valve 41 is opened and gas from gas storage tank 43 is drawn through lines 39 and 23 and through adsorber 21 to provide a countercurrent purge which sweeps the adsorbent and desorbs residual nitrogen. This purge can be carried out as the pressure in adsorber 21 decreases, remains constant at a minimum pressure, or increases, or with any combinations of these pressures. The purge pressure in the adsorber is controlled by regulating the flow rate of gas through valve 41 relative to the capacity of blower 9. Preferably, purge is carried out at increasing adsorber pressure after the adsorber is evacuated to a pressure in the range of 0.2 to 0.8 atma. In an optional purge procedure, in which purge is accompanied by increasing adsorber pressure, the purge step is carried out initially by introducing purge gas at a lower flow rate through valve 41 and then increasing the flow rate of purge gas by opening valve 41 further. This allows enough time for low pressure purge while still allowing enough gas transfer at a high flow rate in a shorter period of time. The total duration of the purge step typically is between about 1.0 and 15 seconds. The step is terminated by closing valve 41.

5. Repressurization

After the purge step is complete, pressurized feed gas is introduced from blower 9 via line 10, valve 15, line 17, and line 19 into adsorber vessel 21, thereby pressurizing the adsorber. Valve 27 remains closed. During the initial stage of repressurization, while the adsorber pressure is subatmospheric, the adsorber optionally can be pressurized in part by allowing atmospheric air to be drawn into the adsorber by opening valves 3 and 16. Valve 37 can be closed and valve 15 opened during this step. Feed repressurization then continues until the adsorber pressure reaches about 1.05 to 2.5 atma. The repressurization step typically lasts for 3 to 30 seconds. The repressurization step begins immediately after the purge step is completed, which means that no intervening process steps are used between the purge step and the feed repressurization step. For example, a dual-end repressurization step (in which pressurized feed gas is introduced into one end of the adsorber and gas from storage tank 43 is introduced into the other end) is not used between the purge and feed repressurization steps described above.

During steps 1 through 5 described above, final oxygen product gas is withdrawn continuously through line 33 and valve 35. Gas storage tank 31 is designed to be of sufficient volume to provide product gas at the required pressure and flow rate for the entire cycle period.

The PSA cycle described above is operated by opening and closing the identified valves at the required times by using hardware and software control systems known in the art. Any microprocessor-based controller which has digital as well as analog signal capability can be used, and software can be readily developed using standard commercially-available packages.

Figure 2:
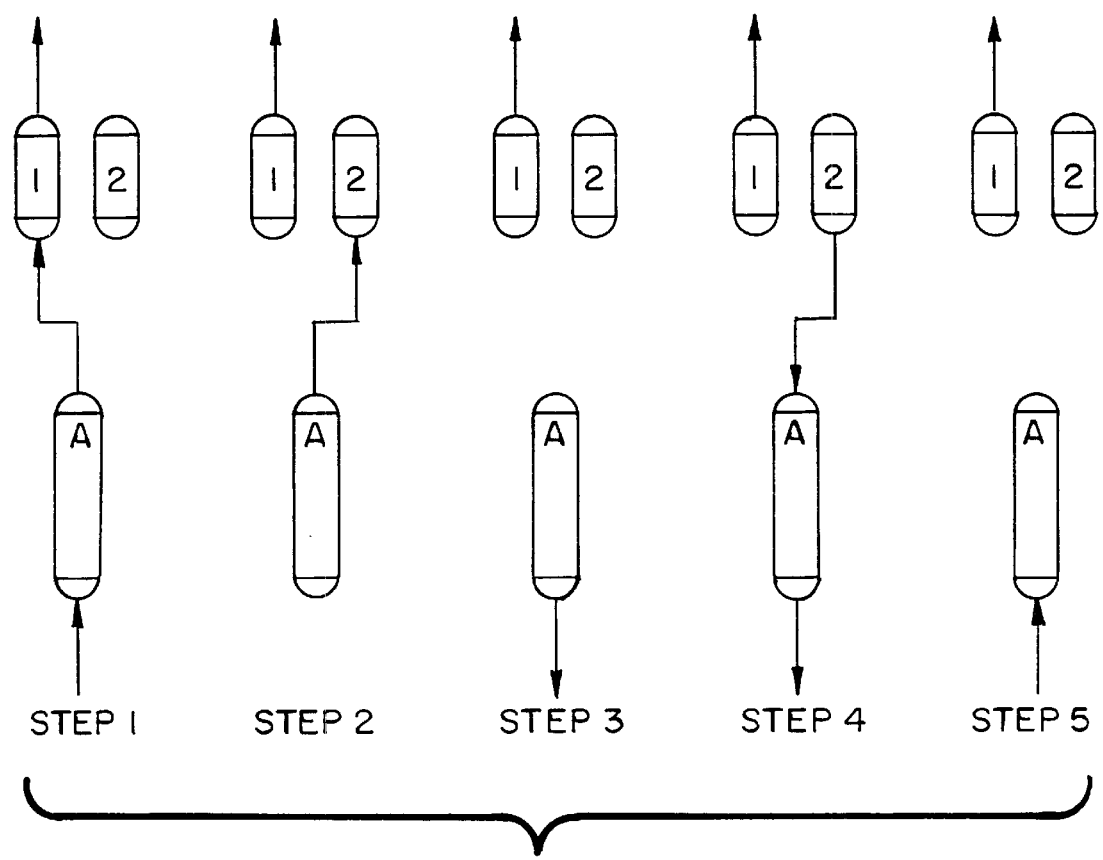
FIG. 2 is a schematic representation of the adsorber and gas storage tank flow configurations during the cycle steps in the process of the present invention.

The steps in the process cycle described above are illustrated schematically in FIG. 2. The adsorber vessel A (corresponding to adsorber vessel 21 in FIG. 1) is in controlled flow communication with first and second gas storage tanks 1 and 2 (corresponding to tanks 31 and 43 respectively in FIG. 1). During Air Feed/Make Product (Step 1), pressurized feed air flows into the adsorber and oxygen-enriched product flows from the adsorber into the first gas storage tank. Final product gas is withdrawn therefrom. This is followed by Depressurization/Collect Purge (Step 2), during which the adsorber is depressurized into the second gas storage tank while withdrawal of final product gas from the first storage tank continues. During Further Depressurization (Step 3), the adsorber is depressurized by withdrawing gas therefrom while continuing withdrawal of final product gas from the first storage tank. During Countercurrent Purge (Step 4), purge gas is provided to the adsorber while it is being evacuated. Immediately thereafter, that is, without any intervening process steps, Repressurization (Step 5) begins and the adsorber is pressurized to the proper level for the beginning of Step 1.

In an optional embodiment of the invention, gas storage tank 43 has a length to diameter ratio greater than about 5. Gas is introduced into the tank and withdrawn from the tank at the same end, and the large length to diameter ratio minimizes gas mixing in the tank during the Depressurization/Collect Purge and the Countercurrent Purge steps. During depressurization, the concentration of the less strongly adsorbed component in the depressurization gas, i.e. oxygen, decreases with time. As a result, the stored depressurization gas concentration will vary axially in gas storage tank 43, with the gas at the far end of the tank having a higher oxygen concentration than the gas at the inlet end of the tank. During the Countercurrent Purge step, therefore, the oxygen concentration of the purge gas withdrawn from the tank will increase with time. This is advantageous for purging because the concentration of the desired product component in the purge gas, i.e. oxygen, is highest at the end of the purge step. This results in a more efficient purge step compared with the use of a well-mixed purge gas collected during the Depressurization/Collect Purge step.

In another optional embodiment of the invention, gas collected from the adsorber vessel during the Depressurization/Collect Purge step is collected sequentially in a first gas storage tank and then in a second gas storage tank. The gas collected in the first tank will have a higher concentration of the less strongly adsorbed component, i.e. oxygen, and the gas collected in the second tank will have a lower concentration of oxygen. During the Countercurrent Purge step, purge gas is taken initially from the second tank and finally from the first tank. This results in a more efficient purge step than when a single gas storage tank is used because the concentration of the desired product component in the purge gas, i.e. oxygen, is higher at the end of the purge step. Also, this allows a greater volume of gas for use in purge and repressurization.

In yet another optional embodiment of the invention, the purging of adsorber vessel 21 can be carried out in two successive steps of (1) introducing gas from the second gas storage tank into the adsorber vessel at a first flow rate, and then (2) introducing the gas from the second gas storage tank into the adsorber vessel at a second flow rate which is greater than the first flow rate.

EXAMPLE

A single bed adsorption pilot demonstration unit containing 1300 pounds of a Li-based X zeolite adsorbent was operated according to an embodiment of the present invention to produce a product gas containing 90 vol % oxygen. The sequence and duration of the process steps is summarized in Table 1 below.

TABLE 1

Summary of Process Steps in Example

| Elapsed Time, Seconds | Process Step |
| --- | --- |
| 0–7 | 1) Air Feed/Make Product |
| 7–14 | 2) Depressurization/Collect Purge |
| 14–16 | 3a) Further Depressurization -- Blowdown and Evacuation by Blower |
| 16–29 | 3b) Further Depressurization - Evacuation by Blower |
| 29–33 | 4a) Countercurrent Purge -- Lower Flow |
| 33–35 | 4b) Countercurrent Purge -- Higher Flow |
| 35–39 | 5a) Repressurization -- Simultaneous Atmospheric and Feed Blower |
| 39–48 | 5b) Repressurization -- Feed Blower |

Figure 3:
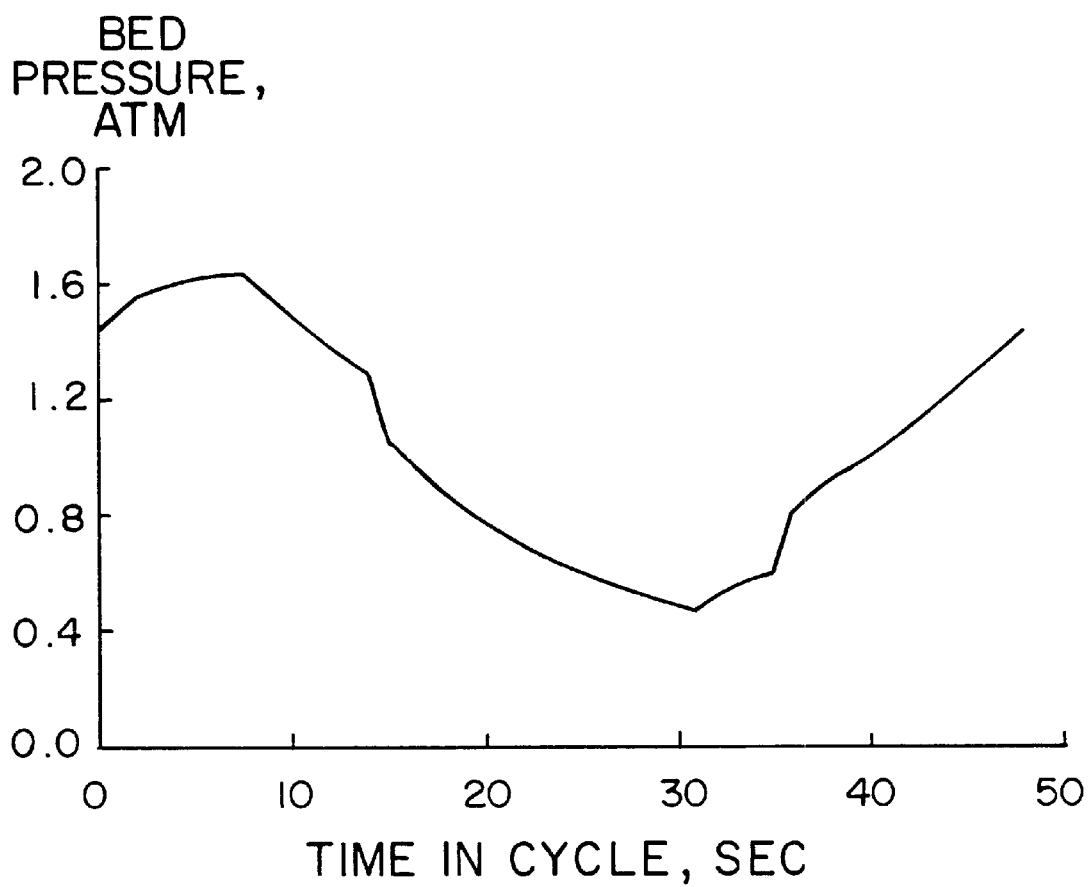
FIG. 3 is a plot of adsorber pressure vs time for an example of an embodiment of the present invention.

The pressure profile of the adsorber vessel during this cycle is shown in FIG. 3. By utilizing the process steps in this cycle, which uses two gas storage tanks, the productivity and oxygen recovery of the single bed unit are 8% greater than those for a cycle involving only one gas storage tank.

The essential characteristics of the present invention are described completely in the foregoing disclosure. One skilled in the art can understand the invention and make various modifications without departing from the basic spirit of the invention, and without deviating from the scope and equivalents of the claims which follow.

What is claimed is:

1. A pressure swing adsorption process for the separation of a pressurized feed gas containing at least one more strongly adsorbable component and at least one less strongly adsorbable component which comprises:

(a) introducing the pressurized feed gas into a feed end of an adsorber vessel containing a solid adsorbent which preferentially adsorbs the more strongly adsorbable component, withdrawing from a product end of the adsorber vessel an adsorber effluent gas enriched in the less strongly adsorbable component, introducing adsorber effluent gas into a first gas storage tank, and withdrawing a final product gas from the first gas storage tank;

(b) terminating introduction of the pressurized feed gas into the adsorber vessel and depressurizing the adsorber vessel by withdrawing gas therefrom and introducing the withdrawn gas into a second gas storage tank;

(c) further depressurizing the adsorber vessel by withdrawing additional gas therefrom;

(d) purging the adsorber vessel by introducing gas from the second gas storage tank into the adsorber vessel while continuing to withdraw gas therefrom;

(e) terminating the introduction of gas from the second gas storage tank into the adsorber vessel and immediately thereafter repressurizing the adsorber vessel by introducing pressurized feed gas into the feed end thereof; and (f) repeating (a) through (e) in a cyclic manner.

2. The process of claim 1 wherein the feed gas is air, the more strongly adsorbable component is nitrogen, and the less strongly adsorbable component is oxygen.

3. The process of claim 1 wherein a final product gas is withdrawn from the first gas storage tank during (b) through (e).

4. The process of claim 1 wherein at least a portion of the purging of the adsorber vessel in (d) occurs while the pressure therein is decreasing.

5. The process of claim 1 wherein at least a portion of the purging of the adsorber vessel in (d) occurs while the pressure therein is at a minimum pressure.

6. The process of claim 5 wherein the minimum pressure is below atmospheric pressure.

7. The process of claim 6 wherein the feed gas is air, the more strongly adsorbable component is nitrogen, and the less strongly adsorbable component is oxygen, and wherein a portion of the pressurized feed gas for repressurizing the adsorber vessel is atmospheric air which flows into the adsorber vessel while the vessel pressure is below atmospheric pressure.

8. The process of claim 1 wherein at least a portion of the purging of the adsorber vessel in (d) occurs while the pressure therein is increasing.

9. The process of claim 1 wherein the second gas storage tank has a length to diameter ratio greater than about 5, and further wherein gas is introduced into the tank at one end in (b) and withdrawn from the tank at the same end in (d).

10. The process of claim 1 which further comprises following (b) further depressurizing the adsorber vessel by withdrawing additional gas therefrom and introducing the withdrawn gas into a third gas storage tank.

11. The process of claim 10 which further comprises following (d) purging the adsorber vessel by introducing gas from the third gas storage tank into the adsorber vessel while continuing to withdraw gas from the adsorption vessel.

12. The process of claim 1 which further comprises, following termination of the introduction of pressurized feed gas into the adsorber vessel and prior to depressurizing the adsorber vessel by withdrawing gas therefrom and introducing the gas withdrawn therefrom into a second gas storage tank, depressurizing the adsorber vessel by withdrawing gas therefrom and introducing the gas withdrawn therefrom into the first gas storage tank.

13. The process of claim 1 wherein at least a portion of the further depressurizing in (c) is effected by venting gas from the adsorber vessel to the atmosphere.

14. The method of claim 1 wherein the purging of the adsorber vessel in (d) is effected by (d1) introducing gas from the second gas storage tank into the adsorber vessel at a first flow rate; and (d2) introducing the gas from the second gas storage tank into the adsorber vessel at a second flow rate which is greater than the first flow rate; while continuing to withdraw gas from the adsorber vessel during (d1) and (d2).

* * * * *